June 8, 1937.　　　　G. R. HAUB　　　　2,083,152
GLASS FEEDER
Filed June 1, 1932　　　　4 Sheets-Sheet 1
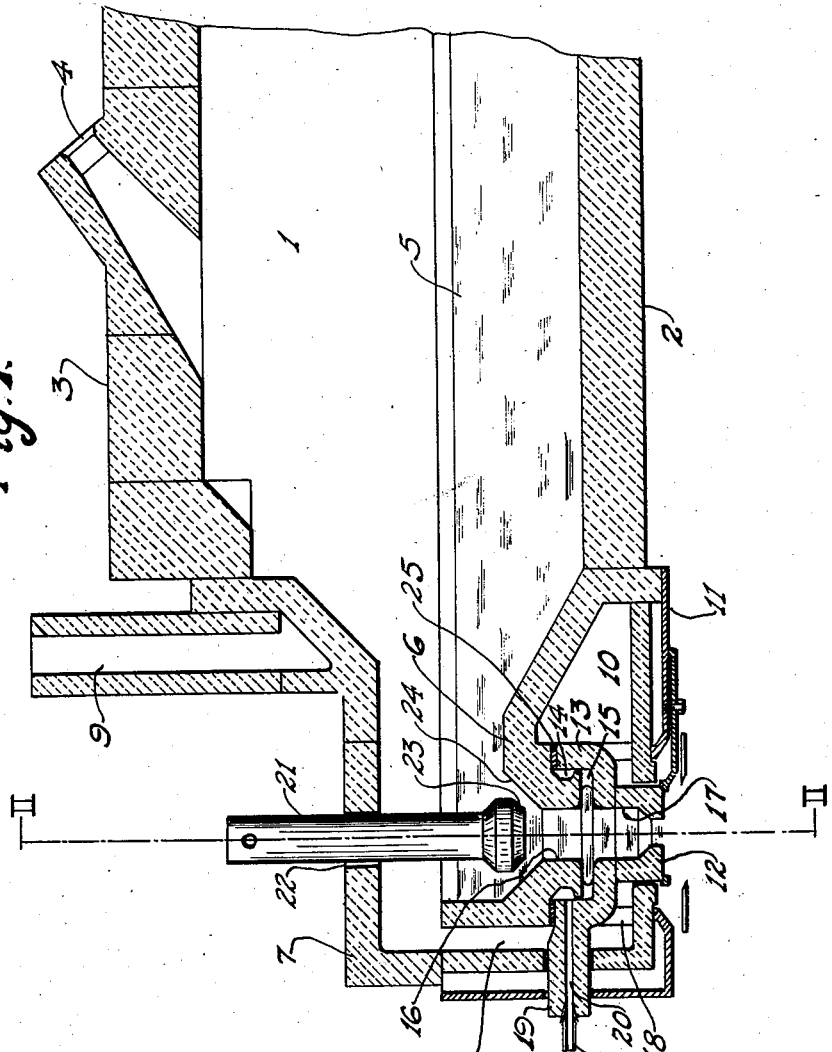
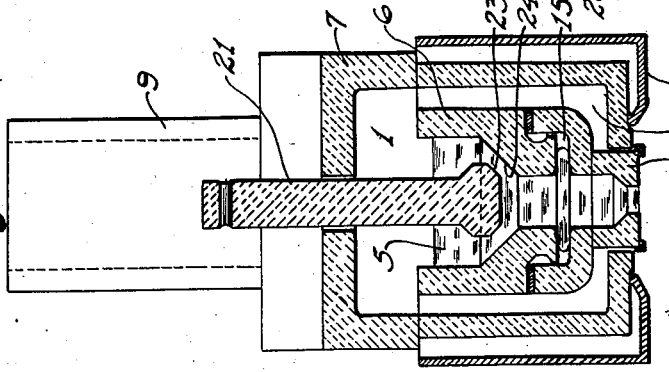
INVENTOR
George R. Haub
by William B. Jaspert
Attorney.

June 8, 1937.  G. R. HAUB  2,083,152
GLASS FEEDER
Filed June 1, 1932  4 Sheets-Sheet 2
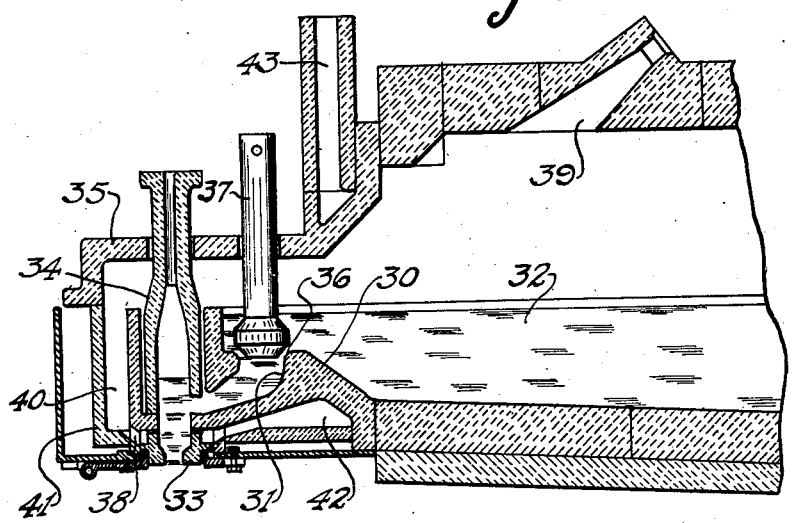
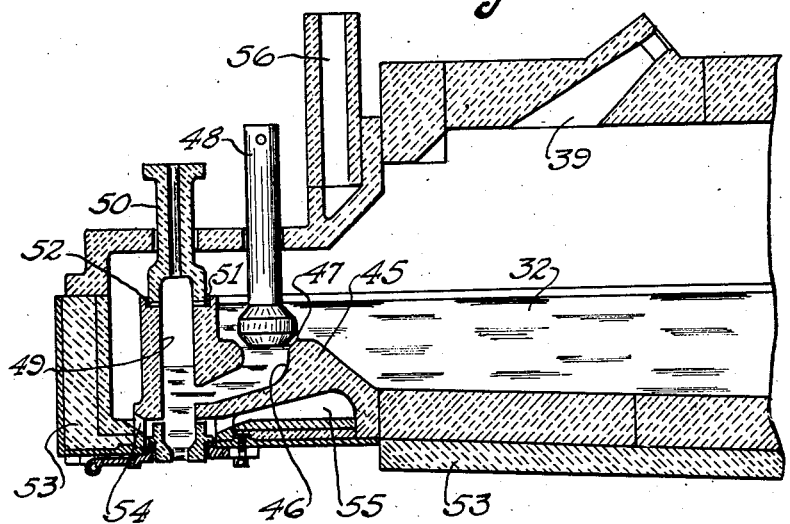
INVENTOR
George R. Haub
by William B. Jaspert
Attorney.

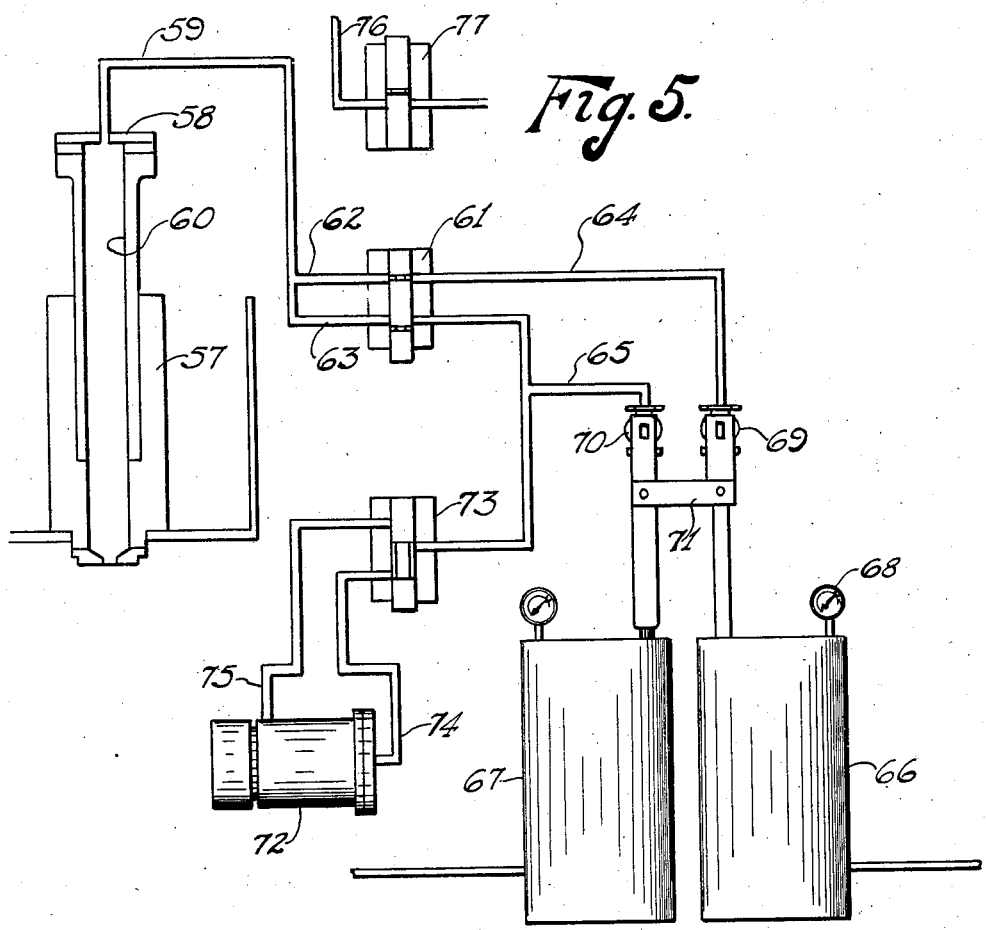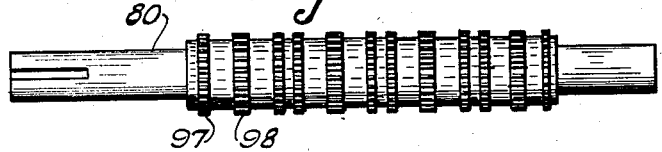

June 8, 1937.  G. R. HAUB  2,083,152
GLASS FEEDER
Filed June 1, 1932  4 Sheets-Sheet 4

INVENTOR
George R. Haub
by William B. Jaspert
Attorney.

Patented June 8, 1937

2,083,152

UNITED STATES PATENT OFFICE 2,083,152

GLASS FEEDER

George R. Haub, Crafton, Pa., assignor to Shawkee Manufacturing Company, Pittsburgh, Pa., a corporation of Pennsylvania Application June 1, 1932, Serial No. 614,652

5 Claims. (Cl. 49—55)

This invention relates to apparatus for segregating mold charges of regulable weight and shape from a mass of molten glass and more particularly the invention relates to glass feeders of the air operated or impulse type.

It is among the objects of the invention to provide a glass feeder of simple and durable mechanical construction which shall embody a minimum number of operating parts requiring few adjustments in obtaining variations in the shape and weight of the extruded mold charges and no adjustment, whatsoever, during the operation of the machine.

The invention further contemplates the utilization of shearing mechanism which shall be coordinated with the movements of the feeding mechanism, and which shall further be adapted for adjustment vertically relative to the discharge orifice of the feeding equipment to thereby vary the shape of the extruded glass mass.

Still a further object of the invention is the provision of means for regulating the supply of the molten glass to the feeding or impulse member, such regulation being effective during the operation of the device to vary the head pressure of the glass above the discharge orifice.

Still a further object of the invention is the provision of a compact feeding well or boot constructed in a manner to adapt it for heating the refractory of which it is constructed to substantially the working temperature of the glass, thereby obtaining positive regulation of the glass flow to maintain uniformity in shape and weight of the extruded glass discharged from the outlet.

Figure 6:
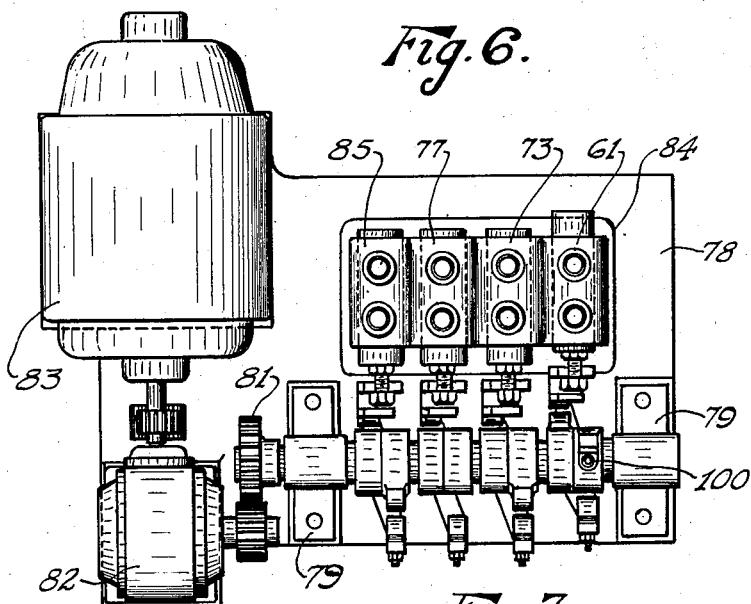
Figure 7:
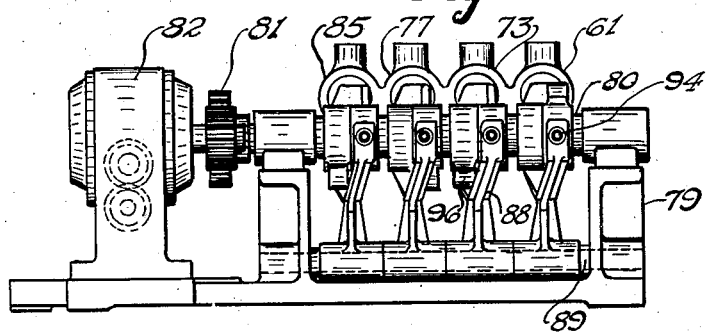
Figure 8:
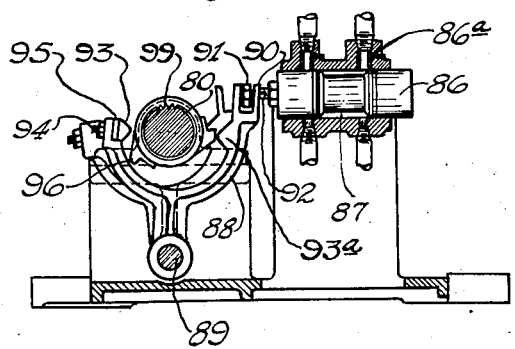

These and other objects of the invention will become more apparent from a consideration of the accompanying drawings constituting a part hereof in which like references designate like parts and in which Figure 1 is a cross sectional view taken longitudinally of a glass feeding mechanism embodying the principles of this invention; Figure 2 a cross sectional view thereof taken along the line II—II of Figure 1; Figure 3 a longitudinal cross sectional view of a modified form of the invention shown in Figure 1; Figure 4 a similar view of a still further modified form consisting of making certain of the parts of the apparatus of Figure 3 integral to obtain greater strength and a more simplified construction; Figure 5 is a diagrammatic view of the feeder impulse member showing the conduit connections thereof with the valves controlling the application of pressures from a source of supply to the glass to be acted upon and to the shear operating cylinder; Figure 6 a top plan view of the valve operating mechanism and the actuating mechanism therefor; Figure 7 a side elevational view of the mechanism shown in Figure 6; Figure 8 an end elevational view partially in section of the cam and valve operating mechanisms of Figures 6 and 7; Figure 9 a side elevational view of the cam shaft; and Figure 10 an end elevational view thereof.

With reference to Figures 1 to 4 inclusive of the drawings, the structure therein illustrated comprises a forehearth generally designated by the reference numeral 1 having a hearth 2 extending from a melting chamber and a top 3 provided with a burner port 4 through which a heating flame is projected to the interior of the forehearth chamber for maintaining the glass, designated by the reference numeral 5, in proper thermal and physical condition.

The front portion of the forehearth is provided with what may be termed a feeder boot 6 constructed of refractory material, which forms an extension of the hearth 2, and the boot is provided with a cover 7 which extends around the top, sides and bottom thereof to form a muffle chamber 8 which constitutes a flue passage for the products of combustion entering the burner port 4.

In the present form of apparatus, the muffle 8 surrounds a substantial portion of the boot and the products of combustion passing therearound are drawn through a stack 9 which communicates with the muffle at the chamber portion 10 at the bottom of boot 6.

The boot is protected and partially supported by a casting 11 which is also adapted to support an orifice ring 12 which constitutes the bottom outlet of the feeder boot.

Disposed within the muffle chamber surounding the lower end of boot 6 is a refractory member 13 constructed to provide an annular chamber 14 around the bottom neck of the boot 6 and an enclosed chamber 15 which communicates with the cylindrical chamber constituted by the constricted portion 16 of the boot and the enlarged portion 17 of the orifice ring. The element 13 is provided with a seat 18 by which it rests on the refractory forming the muffle around the boot and is further provided with an extension 19 having an orifice 20 therein for conducting fluid pressure to the annular chambers 14 and 15. A control valve or gate 21 projects through the opening 22 in the cover member 7 in vertical alinement with the discharge orifice 12 and the valve is provided with a conical seating portion 23 which is complementary in shape to the flared flow inlet 24 of the boot 6.

The refractory member 13 is seated against a gasket 25 which is disposed between the upper edge of the member 13 and the shoulder provided on the boot 6 to provide an air-tight chamber that communicates with the orifice 20 which in turn is connected by a conduit 26 to a source of positive and negative pressure.

The feeder shown in Figures 1 and 2 is adapted to operate in extruding glass charges in the following manner: Valve 21 is adjusted relative to the flow channel 24 of boot 6 to permit a regulable flow of the glass 5 into the cylindrical chamber within the boot 6, the refractory 13 and the orifice ring 12. Such a flow of the glass is in response to the head pressure of the glass above the discharge orifice and the flow from the orifice would be by gravity in accordance with the viscosity of the glass contained in the boot.

By applying air pressure through conduit 26 to the annular chamber 15, the pressure above the discharge orifice 12 would be increased to act upon the glass above the orifice ring in a well-known manner causing the extrusion of a gob of glass at predetermined rates to obtain a mold charge of a particular shape and weight depending upon the prolongation and the intensity of the pressures applied to the annular chamber 15. When a desired gob has been extruded from the orifice ring 12, the pressure in conduit 26 is cut off to allow the glass to neck before shearing and a negative pressure may be utilized to cause the glass in the orifice ring to be retracted causing a decided necking, all as is well known in the art.

The operation as described is precisely the same as in the type of feeders employing an impulse bell or cylinder which is adapted to isolate a portion of the glass mass and to apply positive and negative pressures thereto to cause some of the glass to be extruded from a discharge outlet. By utilizing the construction shown in Figures 1 and 2, the feeding implement is better adapted to thermally control the glass to maintain it in proper physical condition as the application of the heating means is rendered more effective in this type of construction. In other respects, the principle of the two types of apparatus is substantially the same.

In the forms of feeders shown in Figures 3 and 4, the feeder boot 30 is so constructed as to have an offset flow passage 31 leading from the source of glass supply 32 to the glass feeding well which is of cylindrical dimension and in vertical alinement with the orifice ring 33.

In the construction shown in Figure 3, the feeding implement 34 is a separate member which is supported by the feeder boot 30 and projects upwardly through the cover 35.

The flow passage 31 of the boot 30 is provided with a valved seat 36 that is controlled by a valve 37 the stem of which projects through the cover 35, and an annular heating passage 38 is provided around the bottom of the boot and the discharge orifice ring 33 to conduct the products of combustion from a burner port 39 around a muffle chamber 40 provided by the outer refractory 41 surrounding the boot 30 and thence through chamber 42 and out at the stack 43.

In the construction shown in Figure 4, the feeding implement 34 of Figure 3 is formed integrally with the feeding boot 45 in which a flow passage 46 is provided having a valved seat 47 controlled by a valve 48, and pressures are communicated to the cylindrical chamber 49 of the boot through an implement 50 which rests in a counterbored portion 51 of the boot, a sealing gasket 52 being provided for this purpose.

The structure of Figure 4 is illustrated as thoroughly insulated by material 53 that surrounds the jacketing refractory material, so that heat losses by radiation are substantially eliminated and very little heating medium is required to maintain the refractory of the feeder boot 45 at substantially the same temperature as the temperature of the glass 32.

In this construction, as in Figure 3, the bottom of the boot is provided with an annular chamber 54 around which the products of combustion are drawn into chamber 55 and then pass outwardly to a stack 56.

With reference to the diagram of Figure 5, 57 generally designates the feeding implement of either of the types disclosed in Figures 1 to 4 of the drawings, the top of which is provided with a closure 58 and having a conduit 59 connected thereto for applying pressure impulses to the cylindrical chamber 60.

Conduit 59 is connected to a valve 61 by conduits 62 and 63 and the valve 61 is further connected by conduits 64 and 65 to a source of vacuum in a tank 66 and air pressure in a tank 67, the tanks 66 and 67 being provided with gauges 68 to indicate the degree of vacuum and pressure contained therein.

Passage controlling valves 69 and 70 cut off the vacuum and air supply when actuated by a common yoke or cross arm 71 which is connected to both valves 69 and 70. The pressure supply or storage tank 67 is also connected to an air cylinder 72 through a valve 73 which controls the application of air pressure to one end of cylinder 72 by a conduit 74 and to the other end of cylinder 72 by a conduit 75. Similarly, pressure of tank 67 is directed through a conduit 76 controlled by a valve 77 to a timer of a ware-forming machine to coordinate the mold movements of the machine with the operation of the feeder mechanism.

The valves 61, 73 and 77, are more clearly illustrated in connection with Figures 6 to 10 inclusive of the drawings and consist of the following mechanism: A base plate 78 is adapted to be conveniently attached to a portion of the glass melting tank or it may be mounted on a standard adjacent the feeder. The casting is provided with a pair of journal blocks 79 for rotatably journalling a cam shaft 80 which is driven through gear connections 81 with a speed reducer 82, by a motor 83 or other suitable prime mover.

Mounted on the base plate 78 is a valve block 84 containing the valve chambers 61, 73, 77, and an additional valve chamber 85 not shown in Figure 5 which may be employed in controlling the operation of a lehr-stacker for conveying and transferring the finished ware from the blow machine to the lehr.

Disposed within the valve chambers are slidable valve blocks 86 which are provided with annular grooves 87 through which the pressure and vacuum from the supply lines are communicated to the lines leading to the feeding implement and the associated mechanism. The lines leading to the feeding implement may be provided with interchangeable bushings 86a to vary the size of the ports controlled by the valves.

The slide blocks 86 are actuated by rocker arms 88 mounted on a shaft 89 that is disposed below the cam shaft 80, the arms 88 being adapted for pivotal movement on the shaft 89.

The rockers 88 are provided with bifurcated ends 90 which are adapted to engage the head 91 of adjustable screw bolts 92 which are fastened in the slide blocks 86 of the valve. The rocker arms are provided with striking lugs 93 and 93a, the former being adjustable by a screw 94 and spacing washers 95, the washers being disposed between the lugs 93 and the end of the rocker 88. The screws 94 extend through the washers and are screwed into lugs 93 which are drawn tightly against the abutting face of the rocker. By adjusting the lug 93, the port openings may be varied.

As shown in Figure 8, the shaft 80 is provided with cams 96 which project radially outward from the shafts and are adapted to strike the lugs 93 of the rocker arms 88 to subject them to oscillating movement about their pivot 89 thereby effecting corresponding sliding movement of valve blocks 86.

With reference to the mounting of cams 96 on the shaft 80, attention is called to the construction of the shaft as shown in Figures 9 and 10 which illustrate a series of flanges 97 and 98 which are serrated members having teeth 99 which coact with similar teeth formed on the interior of the cams 96.

The spacing between the serrated members 97 and 98 is such that the cams 96 will span these members so that when the cams are loosened they may be moved axially on the shaft 80 a relatively short distance to release the tooth engagement with the members 97 and 98 and then the cams may be adjusted by angular movement to effect engagement of different teeth when they are again slid in place. By providing this construction, the cams are positively held on the shafts and will not be displaced when in operation.

The operation of the cam mechanism is such that by properly setting the cams which may be accomplished by means of set screws 100, Figure 6, the proper timed function of the several cooperating elements such as the application of the pressure impulse to the feeding implement 60, Figure 5, with the operation of the shear cylinder 72 is effected, and the timing of the movements of the ware finishing machine is effected through the valve 77. Also, through the valve 85, the operation of the feeder, the shear and the ware forming machine may be timed with the movements of a take-out and ware-transfer mechanism which conveys the finished article to an annealing lehr.

The present apparatus is especially designed to maintain the glass in the feeder boot at a uniform working temperature so that no adjustment is required once the mechanism has been set to produce a mold charge of a particular shape and weight, and for this reason the cam operating mechanism has been designed to prevent any adjustments on the cams or valves while the machine is in operation.

The only adjustment as pointed out in connection with the description of the device is the angular displacement of the cams which is effected only by removing the cams from their serrated seats on the cam shaft. Another adjustment is the position of the lugs 93 of the rocker arms 88 which can only be accomplished by shutting down the machine and removing or adding the washers 95 in back of these lugs.

There is a further adjustment controlling the stroke or distance of travel of the valve block 86 to vary the size of the port openings 86A, namely, the screw 92 which may be turned to vary the position of the screw head 91 with respect to the end face on the valve block 86, but this adjustment likewise requires that the machine be shut down as it would be otherwise impossible to manipulate the screw heads and lock nuts.

In the operation of the feeders disclosed in Figures 1, 3, and 4, the flow of the glass to the feeder boot is in all cases controlled by the valves of the flow passages so that a given and predetermined height or glass column is maintained above the orifice ring. With this control, and by applying predetermined air pressures and vacuums in the cylindrical chamber of the boot, impulses are applied to the surface of the glass above the orifice ring which effect a corresponding extrusion of a mold charge which is severed at the proper time through the operation of the shear operating mechanism controlled by the common valve mechanism as herein explained. It is, of course, evident that the air of vacuum may be employed alone for producing the gobs.

By conducting the heating medium of the forehearth structure around the refractory material of the boot and especially in the region of the discharge orifice ring as herein provided, there is no need whatsoever of any adjustment of the cams and valves once the proper adjustment has been obtained for a mold charge of a desired shape and weight, so long as the forehearth is fired at a uniform temperature.

I claim:
1. Apparatus for segregating mold charges from a mass of molten glass comprising a forehearth structure having a feeder boot constituting an extension of said structure, said feeder boot having a feeding well in vertical alinement with a discharge orifice at the bottom thereof and having a flow passage at the top of said well provided with a valve seat, an adjustable valve having a face complementary to the seat of the flow passage for regulating the flow of glass to the feeder well, and an annular chamber intermediate the upper and lower extremities of said well and communicating with said feeding well and with a source of variable pressure for subjecting the glass in the well to impulses.

2. Apparatus for segregating mold charges from a mass of molten glass comprising a forehearth structure having a feeder boot constituting an extension thereof, said feeder boot having a well with a discharge orifice at the bottom thereof, a refractory element disposed around said boot to form a muffle chamber for directing products of combustion completely around the refractory material of said boot, a cup-shaped refractory element having an outlet orifice in the bottom thereof in vertical alignment with said discharge orifice disposed below said boot and within said muffle chamber to form with the bottom of said boot a closed impulse chamber communicating with the well in said boot through said discharge orifice, an outlet orifice ring below said refractory element and positioned in alignment with said outlet orifice thereby forming with the refractory element and feeder boot, a cylindrical well for molten glass, and means for supplying pressure impulses to said closed chamber to subject the glass in said well to varying pressures.

3. Apparatus as set forth in the next preceding claim provided with regulable valve means for controlling the flow of glass to the well of said feeding member.

4. Apparatus for segregating mold charges from a mass of molten glass comprising a source of glass supply in communication with a feeder boot, said boot having a raised wall structure forming a well contiguous a cylindrical chamber at the bottom thereof, a perforate refractory member below said boot and cooperating therewith to provide an annular chamber communicating with a source of variable pressure, a discharge orifice ring disposed below said refractory member and having a cylindrical chamber cooperating with said first named cylindrical chamber to form a feeding well, a wall structure surrounding the boot and forming an annular passage around said orifice ring for conducting the hot gases from the glass source around the refractory of the boot and ring to maintain said refractory materials at substantially the working temperature of the glass, and a valve controlling the flow of the glass to said feeding well, said annular chamber communicating with said feeding well to subject the glass in said well to impulses whereby to cause an extrusion of the glass through the orifice ring in excess of the extrusion effected by gravity and the head pressure in said well.

5. A glass feeder including a member through which a column of glass flows by gravity, a pressure and vacuum chamber surrounding the column of glass, and means for creating vacuum and pressure in said chamber, the interior of the member and the interior of the chamber being in communication.

GEORGE R. HAUB.